July 20, 1937.                G. F. WIEDEMANN                2,087,828
                                FISHING DEVICE
                              Filed Jan. 4, 1936

INVENTOR.
George F. Wiedemann
BY
John E. Bang
ATTORNEY.

Patented July 20, 1937

2,087,828

UNITED STATES PATENT OFFICE 2,087,828

FISHING DEVICE

George F. Wiedemann, Milwaukee, Wis.

Application January 4, 1936, Serial No. 57,582

5 Claims. (Cl. 242—96)

My invention relates to a fishing device and more particularly to a type of device that is used as an auxiliary run-off reel.

The object of my invention is to provide a device that will act as a holder for a fishing line.

Another object of my invention is to provide such a holder that is mounted on a swivel and will turn to permit the removal of the line when a pull is exerted at the end of the line.

Another object of my invention is to provide such a device as described that is provided with a means for retaining the end of the line, said means constructed to release the line when a pull is applied to the line.

A further object of my invention is to so construct the device as to permit the line when wound to be suspended permitting free air circulation on all sides to prevent the line from deteriorating due to moisture.

A still further object of my invention is to provide a device of the character described that will incorporate all the features mentioned yet be inexpensive to manufacture and convenient for the user to carry and apply.

Other and further objects of my invention will become readily apparent to persons skilled in the art from a consideration of the following description when taken in conjunction with the drawing, wherein.

Figure 1:
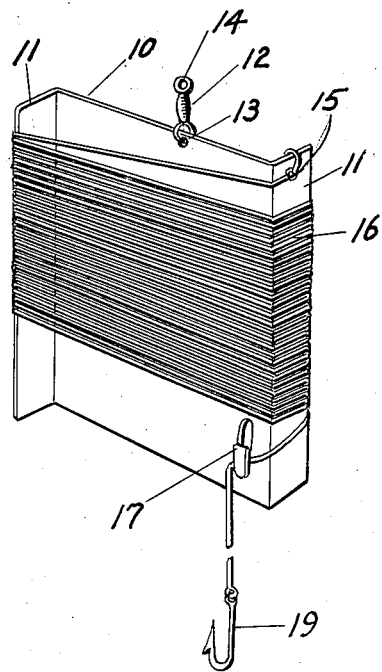
Figure 1 is a perspective view of the device illustrating its construction and the manner in which the fishing line is applied to the device the end of the line being retained by a clip.
Figure 2:
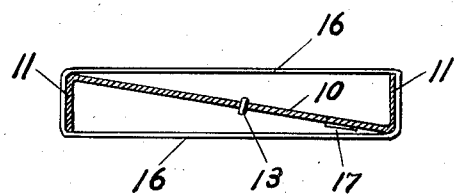
Figure 2 is an end view of the device illustrating the suspension of the fishing line.

Referring to the drawing in detail wherein like characters of reference denote corresponding parts, the character 10 represents a body of the device consisting of a flat piece of metal or the like having its edges 11 bent at right angles to the body 10, but in opposite relation to one another. The body 10 is further provided with an aperture 13 through which a swivel 12 is attached. A depending loop 14 of the swivel 12 is employed for fastening the device to a fish pole or the like. One of the angularly disposed sections 11 is equipped with an aperture 15 employed to fasten a fish line 16 to the body 10. The line 16 is wound around the entire body 10 as shown and the end of the line 16 is inserted under a clip 17 substantially as shown. This clip 17 may be formed integral with the body 10 as illustrated, or may be constructed of a separate piece of material attached or riveted to the body 10.

The object of the clip 17 is to retain the end of the line 16 supporting a hook 19. The object of the angularly disposed sections 11 being in opposite relation to one another is to suspend the line 16 away from the body 10 allowing free air circulation around the line 16.

Figure 3:
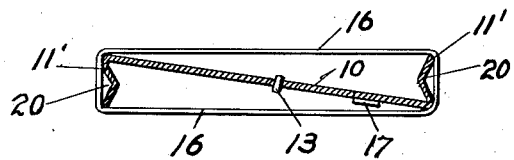
Figure 3 is an end view of a modified construction having the ends concaved.

In Figure 3 I show a modified construction in which the angular sections 11' are constructed with depressed grooves at 20 to further allow for air circulation around the line 16 at these points.

It is manifest to anyone familiar with the art of fishing that when fishing through a hole in the ice or when having a fishing pole placed in a fixed position on the shore that it is desirable to have the hook on which the bait is attached on the end of the line, submerged a certain distance below the surface, and when a fish contacts the bait it is desirable to have the line so arranged so that the fish is permitted to carry the bait for a short distance before swallowing same.

The device covered by my invention is fastened to the end of a pole or the like by means of a cord in the loop 14 of the swivel 12. This will normally suspend the device above the surface of the water and the line being fastened at 15 and wound around the body 10 has its end supporting the baited hook 19 which is below the surface of the water inserted under the clip 17. When the fish contacts the baited hook 19 it will swim away with the hook causing the line to disengage from the clip 17 and the body 10 will revolve allowing the line 16 to unwind giving the fish ample time and opportunity to swallow the bait. After the fish is brought to the surface it is only necessary to wind the line 16 back onto the body 10 of the device inserting the line under the clip 17 which again puts the device in operative order.

The construction of the body 10 with the angularly disposed members 11 and 11' allows the wet line 16 to be exposed to the air on all sides thus giving it an opportunity to dry.

In the chosen embodiments of my invention exemplified by the accompanying drawing there are present certain novel refinements more fully referred to and specifically pointed out in the appended claims.

Having thus described my invention what I claim and desire to secure by Letters Patent in the United States, is:—

1. A fishing device of the character described, comprising a flat body, oppositely angled members one at each vertical side edge of said body, said angled members being longitudinally and inwardly grooved, said body having an aperture near its upper edge, a swivel engaging said aperture, and means for fastening a fishing line to said body.

2. A device of the character described, comprising a body constructed of flat material and having an aperture adjacent its upper edge for the securement therethrough of one end of a fishing line, side members projecting angularly in opposite directions from said body, a means on said body adjacent its lower edge for securing the other end of the fishing line, and a swivel attached to the upper edge of said body for its suspended support.

3. A fishing device of the character described comprising a body constructed of flat material, side members projecting in opposite directions from and at right angles to said body, said body having an aperture near its upper edge, a swivel engaging said aperture, means for fastening one end of a fishing line to said body, and a clip means on said body for releasably securing the other end of said line.

4. A fishing device of the character described comprising a body constructed of flat material, side members integral with said body and projecting in opposite directions at right angles thereto, said body having an aperture for the securement of one end of a line therethrough, and a clip means integral with said body for retaining the other end of a line wound around the body.

5. A fishing device of the character described comprising a body constructed of sheet metal, oppositely angled members formed by bending opposite edges of said body, said body having an aperture near its upper edge, a swivel engaging said aperture, means for fastening a fishing line to said body, and clip means adjacent the lower edge of said body, for releasably securing the other end of the line.

GEORGE F. WIEDEMANN.